Dec. 21, 1948.　　　C. E. PATTERSON　　　2,457,105
COUPLING
Filed Dec. 20, 1944　　　3 Sheets-Sheet 1
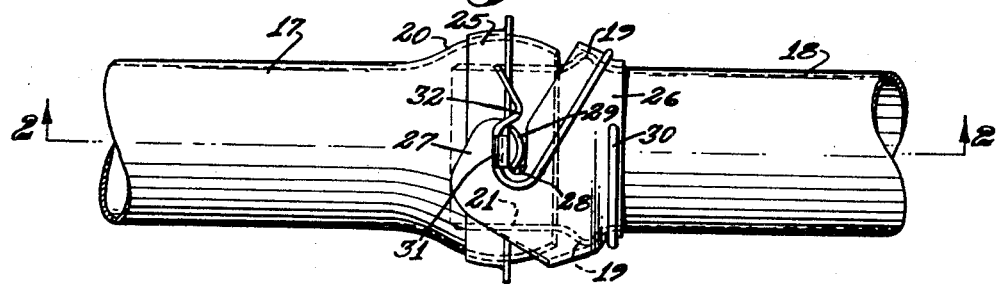
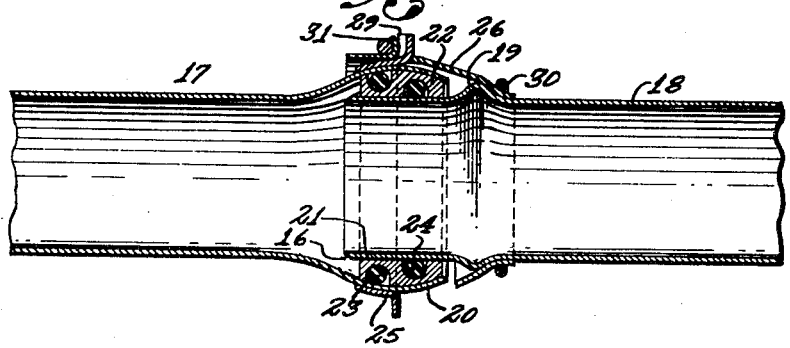
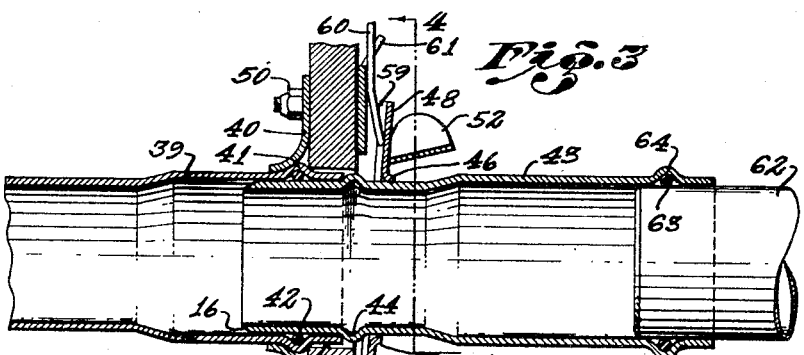
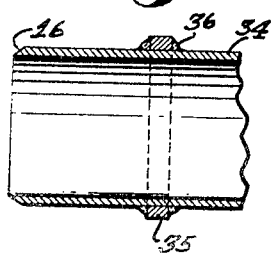
INVENTOR.
Charles E. Patterson
BY Carlos G. Stratton
ATTORNEY

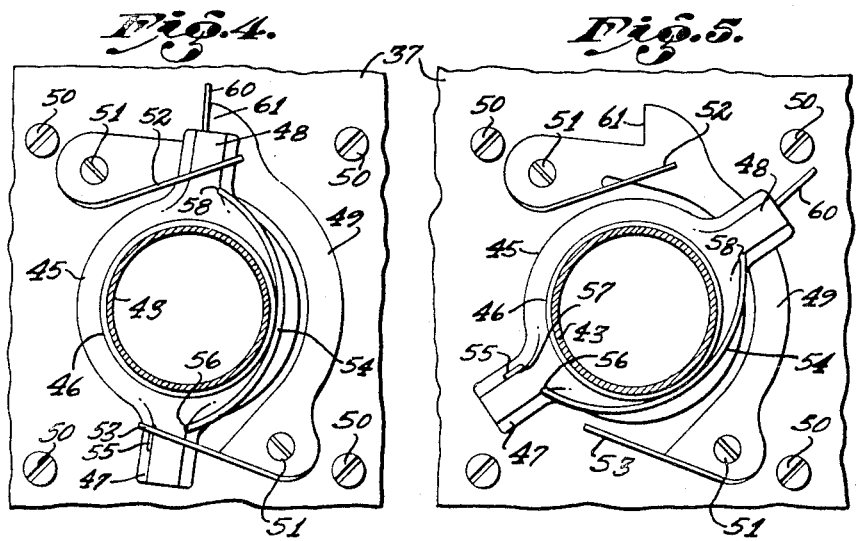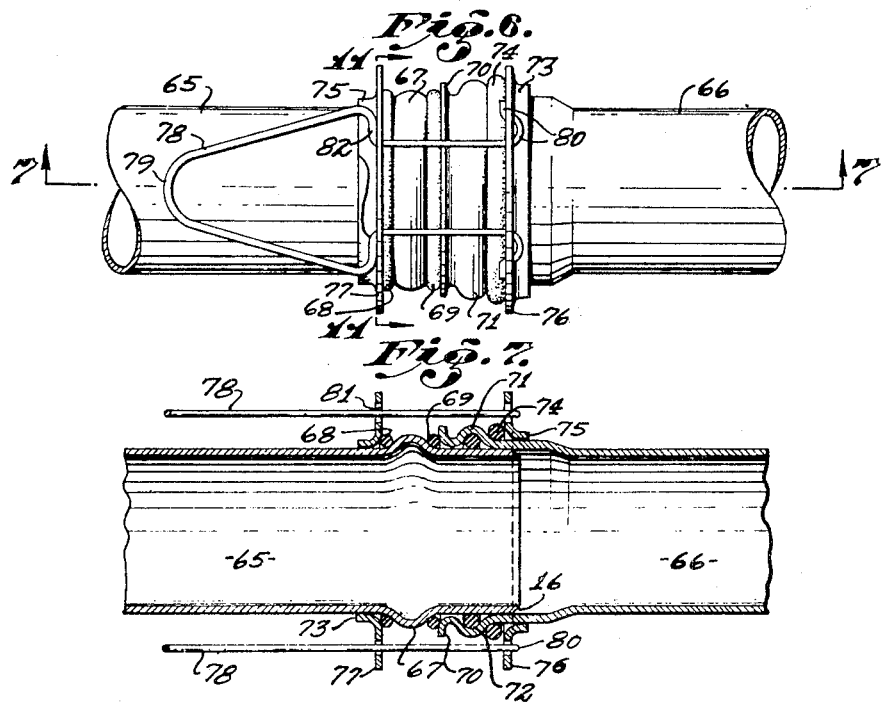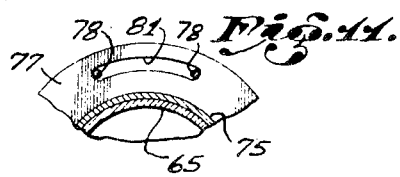

Dec. 21, 1948.  C. E. PATTERSON  2,457,105
COUPLING
Filed Dec. 20, 1944  3 Sheets-Sheet 3
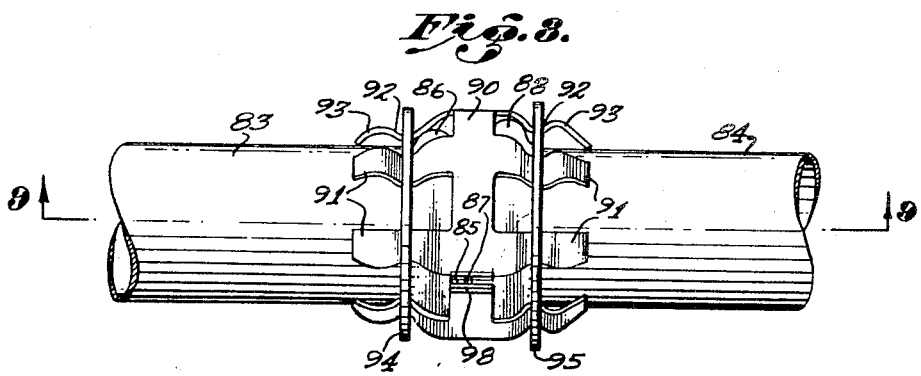
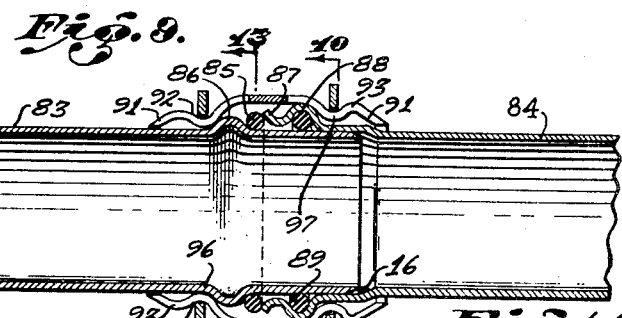
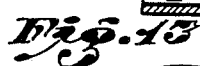
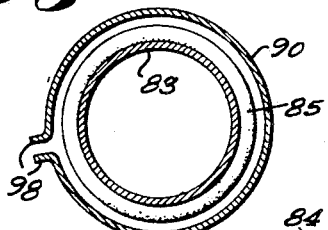
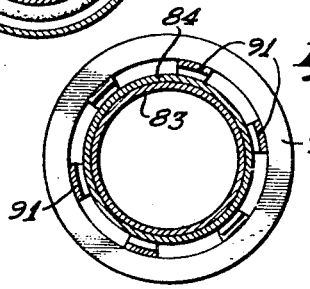
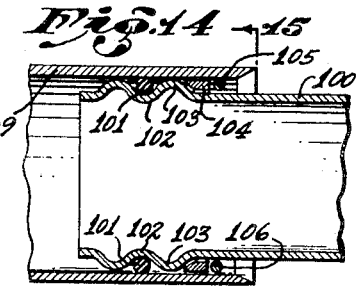
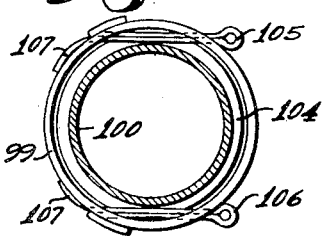
INVENTOR.
Charles E. Patterson
BY Carlos G. Stratton
ATTORNEY Patented Dec. 21, 1948

2,457,105

UNITED STATES PATENT OFFICE 2,457,105

COUPLING

Charles E. Patterson, Los Angeles, Calif.

Application December 20, 1944, Serial No. 569,007

8 Claims. (Cl. 285—163)

My invention relates to couplings and more particularly to means for connecting conduits together.

An important object of the invention is to provide means for quickly and effectively connecting conduits together in fluid-tight connection, which connecting means may be as quickly disconnected for replacement, repairs or any other purpose.

Another object is to provide connecting means that will not only include resilient means for maintaining the fluid-tight connection, but will also include snap-acting spring means yieldingly tending to maintain the resilient means under pressure.

A further object is to provide means to yieldingly tend to hold the connection together and resiliently resist disengaging of the connecting means.

Still another object is to provide easily obtainable, simple means to hold the connected elements together, at sides thereof, in combination with means to distribute the load around the connected conduits.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a broken, elevational view of an embodiment of certain of the foregoing objects.

Fig. 2 is the longitudinal sectional view taken on the line 2—2 of Fig. 1.

Fig. 3 is the longitudinal section of a modified construction.

Figs. 4 and 5 are transverse sections taken on the line 4—4 of Fig. 3, showing the fastening means in different positions respectively.

Fig. 6 is a broken elevation of a still further modified construction.

Fig. 7 is a longitudinal section taken on the line 7—7 of Fig. 6.

Fig. 8 is a broken elevation of another construction of connecting means.

Fig. 9 is a longitudinal section taken on the line 9—9 of Fig. 8.

Fig. 10 is a transverse section taken on the line 10—10 of Fig. 9.

Fig. 11 is a broken section taken on the line 11—11 of Fig. 6.

Fig. 12 is a broken, longitudinal section showing still another modified construction.

Fig. 13 is a transverse section taken on the line 13—13 of Fig. 9.

Fig. 14 is a broken, longitudinal section through an additional modification.

Fig. 15 is a transverse section taken on the line 15—15 of Fig. 14.

Referring more in detail to the drawings, the reference numbers 17 and 18 indicate conduits which have a swivel and universal connection with each other. All the male conduits in the present invention have externally bevelled ends, as shown at 16, to aid in their insertion. Conduit 18 has a bead or other external enlargement 19, while the conduit 17 has an end 20 that is a segment of a sphere.

Between the cylindrical end 21 of the conduit 18 (beyond the bead 19) and the end 20 of conduit 17 is disposed an annular packing carrier 22 that is cylindrical on its inner surface and a segment of a sphere on its outer surface, conforming respectively with the outer face of the end 21 and with the inner face of the end 20. Said outer and inner faces of the carrier respectively have outwardly and inwardly facing annular recesses for receiving O sealing rings 23 and 24. It is believed clear that with this arrangement the conduit 17 may be tipped universally in relation to conduit 18 without disturbing the sealing relationship of the O rings.

To maintain the conduits 17 and 18 in telescoping connection with each other, collars 25 and 26 are slipped on the conduits 17 and 18 from the small ends thereof and slid onto the curved end 20 and the bead 19. The collar 26 has a hook 27 defining a recess 28 with the body member of the collar 26, while the collar 25 has a lip 29 normally engaging the recess 28. One end of a wire 30 embraces the collar 26 and extends under the bent-over lug 31 on collar 26 along the side of the recess 28. The other end of the wire 30 has a spring snap 32 that resiliently bars the entrance to the recess 28. The spring snap yieldingly retains the lip 29 in the recess, to hold the conduit sections 17 and 18 together.

In use, the carrier 22, is assembled in the curved end 20, with the O rings in place, as shown. The end 21 is inserted in the carrier to the position shown. The collars and/or the slip connection of the conduit sections are rotatable to cause the lip 29 to be engaged by the recess 28. During such engaging action, the snap-acting spring 32 is sprung out of the way to admit the lip to the recess, and thereafter the spring snaps back in position, tending to prevent disengagement of the lip 29 from the recess, and the fluid-tight connection is maintained.

Fig. 12 illustrates the conduit section 34 that may be employed instead of the conduit section 18, the only difference being that instead of the bead 26, a ring 35 may be mounted circumferentially of the conduit 34. The ring 35 may be welded, brazed, soldered or otherwise fastened in place, as suggested by 36. Such rings may be used instead of beads throughout.

The form shown in Figs. 3, 4 and 5 is of particular use in connecting conduit sections through a wall, altho it has to be understood that this form has many other uses and that the other forms herein may also be connected through a wall. A wall is suggested at 37 provided with an opening 38. A conduit section 39 is held in place in the opening 38 by means of a clamping annular plate 40 that is bolted to the wall 37, as shown at 50. The plate 40 engages a bead 41 on the conduit 39. An O ring 42 is confined within the bead 41.

A telescoping conduit section 43 has a bead 44 arranged to abut the end of the conduit section 39, to limit inward telescoping movement of the conduit sections. Means to prevent the separation of the conduit sections include a ring 45 that has a flange 46 embracing the conduit section 43 behind the bead 44. Ring 45 carries radial arms 47 and 48. A plate 49 bolted to the wall 37, as suggested at 51, has lugs 52 and 53 bent at angles to the body of the plate 49. The lugs have their ends spaced from the body of the plate 49 to provide recesses into which the arms 47 and 48 are movable, as shown in Figs. 3 and 4, to lock the ring 45 in place.

Spring locking means comprises a resilient wire 54 that extends part way around the ring 45. One end 55 of the wire 54 is hooked through apertures 56 and 57 in the arm 47, to anchor said wire end in place. The other end 60 of the wire 54 passes through an aperture 58 and extends upwardly along a channel 59 on the inner face of the arm 48. The wire end 60 extends beyond the end of the arm 48 to engage an outwardly bent stop 61 on the plate 49, when the ring 45 is in a locked position. An additional conduit 62 is shown in Fig. 3, having a slip connection with the conduit section 43 and having a resilient O ring 63 on the inside of a bead 64 on the conduit section 43.

In the use of the form shown in Figs. 3 to 5, the conduit sections 39 and 43 are telescopically slid together with the O ring 42 providing packing therebetween. To hold the sections together, the plate 40 is bolted to the wall 37 in a position to engage the bead 41, while the ring 45 embraces the conduit section 43 behind the bead 44. To lock the ring 45 in place, it is turned in a counterclockwise direction from the position shown in Fig. 5 to the position shown in Fig. 4. In the latter position, arms 47 and 48 are in the recess formed by the spacing of the lugs 52 and 53 from the body of the plate 49 and the wire end 60 is snapped in back of the stop 61, to lock the ring 45 in position. The conduit sections 39 and 43 are thereby firmly held in position. To release same, the end 60 of the spring wire is moved out from behind the stop 61 and the arms 47 and 48 are then swung in a clockwise direction to the position shown in Fig. 5. The conduit sections may then be drawn apart.

In the form shown in Figs. 6, 7 and 11, conduit sections 65 and 66 are telescoped together. A bead 67 on the section 65 has resilient O rings 68 and 69 at either side thereof. A flanged rim 70 at the end of section 66 abuts the ring 69. The section 66 in turn has a bead 71 containing a similar O ring 72. The end of the section 65 has a tight sliding fit with the ring 72. An O ring 74 is arranged around the section 66 against the bead 71.

On the opposite sides of the rings 68 and 74 and surrounding the sections 65 and 66 respectively are follower rings 73 and 75 that have radially extending flanges 76 and 77. The rings 73 and 75 have curved backs that bear against the rings 74 and 68, as best shown in Fig. 7. Thus the O rings 68, 69 and 74 act as resilient snubbers. Spring loops 78 have generally pointed mid-portions 79 while their ends are passed in and out through openings in the flange 76, as suggested at 80. The flange 77 is slotted as shown at 81, to receive the loops 78 at opposite sides.

In assembling, the form shown in Figs. 6, 7, and 11, the sides of the loops 78 are bent towards each other, so that shoulders 82 may be inserted through the slots 81. Then when the sections 65 and 66 are slid together with the followers firmly against the rings 68 and 74, loops 78 are allowed to spring outwardly to the position shown, releasably locking the followers together.

In the form shown in Figs. 8, 9, 10 and 13, conduit sections 83 and 84 are again telescopically slid together. The sections 83 and 84 are preferably formed, i. e., they are shaped in manufacture, from relatively thin material to provide beads, as contra-distinguished from having their beads cut by machining. A resilient O ring 85 embracing section 83 rests against a bead 86 in said section. An outwardly curved lip 87 at the end of the conduit section 84 abuts against the ring 85, whereby the ring 85 acts as a snubber. A section 84 also has a bead 88 containing a resilient ring 89 which packs the space between the conduit sections. A resilient band 90 is provided with resilient fingers 91. The band and its fingers span the overlapping ends of the conduit sections. The fingers 91 have depressions 92 and knuckles 93. Rigid rings 94 and 95 snap over the resilient knuckles 93 and are held in place by the knuckles, while the inward facing ribs 96 and 97, formed by the depressions 92, engage the beads 86 and 88 respectively, to prevent separation of the conduit sections 83 and 84. The band 90 does not completely surround the joint, in order to allow room for the band to elongate circumferentially under the influence of the rings. Tabs 96 at adjacent ends of the band 90 facilitate drawing the ends together and so that rings 94 and 95 may be snapped over the fingers thereof.

In assembling the form shown in Figs. 8, 9, 10 and 13, the conduit sections are slid together, compressing the resilient ring 85 between the bead 86 and the lip 87 and deforming O ring 89. The band 90 is wrapped around the overlapping joint. Then the rigid rings 94 and 95 are snapped over the knuckles 93 into depressions 92, thus preventing the separation of the conduit sections at the engagement of the inward beads 96 and 97 of the band 90 with the outward beads 86 and 88 of the conduit sections.

In the form shown in Figs. 14 and 15, telescoping sections 99 and 100 are slid together with an O ring 101 in the circumferential recess 102, effectively packing the space between the conduit sections. A bead 103 at the side of the recess 102 provides an abutment for a continuous annular follower member 104. Cotter pins or locking wires 105 and 106 at opposite sides of the connection extend through aligned apertures in the wall of the conduit section 99. The ends 107 of the cotter pins are bent against the outward face of the section 99. Follower 104 distributes the load around the bead 103. It is believed clear without further illustration that one or more cotter pins may be used and spaced as desired around the periphery.

To assemble form shown in Figs. 14 and 15, sections 99 and 100 are telescoped together. The follower member 104 is thereupon inserted in between the sections. Cotter pins 105 are then passed through the aligned openings in the section 99 and the ends of the pins spread apart and bent against the outer face of the section 99, thus effectively locking the sections together. Of course, to separate the sections, this procedure is reversed.

While I have illustrated and described what I now regard as the preferred embodiments of my invention, the constructions are, of course, subject to modification without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In connecting means, telescoping, tubular conduit elements; a resilient, deformable ring between the elements, the elements being dimensioned to frictionally engage the ring means as the elements are slid together, deforming the ring means during such sliding connection to place the ring under compression, a band around overlapping parts of the elements and inter-engaging with the elements and holding same together, the band having resilient fingers projecting in opposite directions and providing recesses peripherally and rigid ring means surrounding the band and disposed in the recesses and clamping the band in its element engaging position.

2. In connecting means, telescoping, tubular conduit elements; packing between the elements, the elements being dimensioned to deform the packing from its original shape and rendering the connection liquid tight; a resilient band around overlapping parts of the elements, inter-engaging with the elements and yieldingly holding same together, and means surrounding the band, placing the band under compression and clamping the band in its element engaging position.

3. A pipe joint comprising interfitting sections each having an annular bead, a seal ring between the sections and contained in the bead of one of said sections, resilient means surrounding the beads of the pipe sections, and means to press said resilient means into engagement with the outside of said beads to lock said sections together.

4. A pipe joint comprising telescoping tubular sections, one of said sections having a lip and an enlargement adjacent thereto, the other section having an enlargement spaced from said lip, a seal ring in the enlargement of the first named section, a snubber ring between said lip and the enlargement of the other section, and resilient means to connect the sections together and hold said lip engaged with said snubber ring.

5. A pipe joint comprising telescoping tubular sections having enlargements, a seal ring between said sections, a ring between the end of one section and the enlargement of the other section, resilient means on overlapping parts of the sections and engaging the sections, and means to press and hold said resilient means in compressed engagement with said sections to hold same together.

6. A pipe joint comprising telescoping tubular elements having enlargements, one of said elements having a bead between the enlargement and end thereof, a seal ring between said elements and in said bead, a band surrounding the telescoped sections and provided with resilient fingers overlapping parts of and engaging the sections, and means to force and hold said fingers against said enlargements and said bead to lock said sections together.

7. A pipe joint comprising telescoping, tubular elements having formed beads thereon, a resilient O-ring narrowly confined in a bead on the outer element and disposed in sealing relation between the elements, and means engaging the beads on the elements to hold same together.

8. A pipe joint comprising telescoping tubular sections having formed enlargements thereon and one of said sections having a bead between its enlargement and the end thereof, a continuous O-ring of yielding material disposed in said bead, a resilient hand surrounding said telescoped section, and rings engaging said band and arranged to press same against said enlargements and said bead to hold said sections together.

CHARLES E. PATTERSON.

REFERENCES CITED

The following references are of record in the file of this patent:

UNITED STATES PATENTS

| Number | Name | Date |
|---|---|---|
| 646,011 | Sterling | Mar. 27, 1900 |
| 1,985,899 | Jahn | Jan. 1, 1935 |

FOREIGN PATENTS

| Number | Country | Date |
|---|---|---|
| 23,369 | Great Britain | Mar. 8, 1906 |
| 458,958 | Great Britain | Dec. 30, 1936 |
| 221,567 | Germany | Dec. 3, 1908 |
| 360,241 | France | Feb. 16, 1906 |